United States Patent
Korpel

[15] 3,636,248
[45] Jan. 18, 1972

[54] ACOUSTICAL HOLOGRAPHY BY OPTICALLY SAMPLING A SOUND FIELD IN BULK

[72] Inventor: Adrianus Korpel, Prospect Heights, Ill.

[73] Assignee: Zenith Radio Corporation, Chicago, Ill.

[22] Filed: Mar. 5, 1970

[21] Appl. No.: 16,873

[52] U.S. Cl. ....................178/6, 350/3.5
[51] Int. Cl. ....................H04n 1/04
[58] Field of Search ....................178/6; 350/161, 3.5; 250/199

[56] References Cited

UNITED STATES PATENTS 3,488,438 1/1970 Korpel....................178/6 SP

*Primary Examiner*—Robert L. Griffin
*Assistant Examiner*—Barry Leibowitz
*Attorney*—John J. Pederson

[57] ABSTRACT

A coherent monochromatic light beam is directed into a light-sound interaction cell in which a spatially modulated sound field of constant frequency-carrying image information is propagated nominally transversely to the beam by means of a transducer attached to the sound cell and driven by an appropriate constant frequency signal. The beam is focused about any desired point in the sound field so that a scattering interaction is obtained. The focal region is maintained narrower than the sound wavelength so that a temporal and spatial modulation is imparted to the light representative of the phase and amplitude of the sound field at the focal region. Interposed in the path of such modulated light is a photodetector preceded by a demodulator comprised of either a spatial filter or quarter-waveplate and analyzer. The photodetector extracts an output signal at the sound frequency whose phase and amplitude is representative of that of the sound field about the desired focal region. Such a signal may be recorded or displayed either conventionally, or holographically, if the output signal is mixed with a reference signal derived from the constant frequency transducer signal.

12 Claims, 8 Drawing Figures

Inventor
Adrianus Korpel
By [signature]
Attorney

Inventor
Adrianus Korpel
By John J. Pederson
Attorney

ACOUSTICAL HOLOGRAPHY BY OPTICALLY SAMPLING A SOUND FIELD IN BULK

BACKGROUND OF THE INVENTION

This invention relates to acoustic light modulators and to the employment of such modulators in imaging systems. More specifically it relates to a system for temporal and spatial modulation of a light beam in accordance with the spatial modulation information of a sound field at a specific small region within that field, and for the extraction of a signal from such modulated light which carries the spatial modulation information of the sound field at such a specific small region to control a display or recording apparatus. In acoustic light modulation as employed by the invention, a density wave propagated in a suitable medium modulates a light beam passing therethrough by a scattering interaction. As utilized herein, the term "light" includes radiation in both the invisible and visible portions of the spectrum, and the term "sound" includes acoustic waves in both the audible and superaudible ranges.

Heretofore, systems have existed for optically deducing sound-field spatial modulation from an essentially two-dimensional sample. For example, a light beam might be directed to illuminate and to be modulated by the dynamic or static distortions of an elastic or viscoelastic surface which result from an impingent sound field. In another classical light modulation technique, a light beam of a given limited height of the order of the sound wavelength is directed transversely to the direction of sound wave front in the sound cell, with interaction length of the light travel across the cell determining the intensity of the diffracted light orders. In the prior art systems see, for example "Optical Probing of the Fresnel and Fraunhofer Regions of a Rectangular Acoustic Transducer," IEEE Transactions on Sonics and Ultrasonics, Vol. SU–15, No. 3, July 1968, the sonically diffracted light is usually either split into discrete orders, with the first order characteristically having an intensity proportional to the sound pressure amplitude, or emerges as a single phase modulated beam carrying an image varying in size with the sound amplitude, depending on whether the height of the light beam in the direction of sound wave front propagation is of the same order as the second wavelength or much smaller. In either case, the information obtained is related to the average sound pressure integrated over the entire length of light beam travel across the sound cell.

It is an object of the present invention to provide a system for producing an output signal for establishing a display or recording which is simply related to the instantaneous sound amplitude and phase at any chosen point within the sound field.

It is yet a further object of the present invention to provide a display system and light modulator in which a light beam is made to converge to form a focused spot within a sound field propagating transversely to the beam to sample point-by-point the amplitude and phase of the sound field.

A more specific object of the present invention is to provide an acoustic microscope.

SUMMARY OF THE INVENTION

In accordance with the invention, a system for modulating coherent monochromatic light in accordance with the acoustic amplitude and phase exhibited in a small localized region about any chosen point within a sound field comprises a light-sound interaction cell which includes a sound-conducting medium and which operates at a constant acoustic frequency to propagate sound waves throughout the medium, establishing the sound field. Means are provided for projecting into the sound field a coherent monochromatic light beam in a direction generally transverse to that of the sound propagation. Also provided are means for focusing the light beam about any desired point within the sound field into a small localized region whose width in the direction of sound propagation at the point is much smaller than half the wavelength of the sound waves, with the sound waves imparting a temporal and spatial modulation in a scattering interaction to the light emerging from the sound field in accordance with the phase and amplitude of the sound at the focal region.

A system for producing a signal varying in accordance with the acoustic amplitude and phase exhibited in a small localized region about any chosen point within the sound field of waves propagated at a constant acoustic frequency comprises a light sound interaction cell which includes a sound-conducting medium and which operates at a constant acoustic frequency to propagate sound waves throughout the medium, establishing the sound field. Means are provided for projecting into the sound field a coherent monochromatic light beam incident in a direction generally transverse to that of the sound propagation. Means are provided for focusing the incident light beam into a small localized region about any desired point within the sound field. The focal region having a width in the direction of sound propagation at the point which is much smaller than half the wavelength of the sound waves and the sound waves imparting temporal and spatial modulation in a scattering interaction in accordance with the phase and amplitude of the sound at the focal region to the light emerging from the sound field. Also provided are means including a photodetector receiving the emergent light for detecting the beat frequency between the scattered and nonscattered emergent light and for producing a signal in accordance with the beat frequency, the signal being simply related to the acoustic frequency and being modulated in accordance with the amplitude and phase in the small focal region.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figures 1, 1A, 2A, 5:
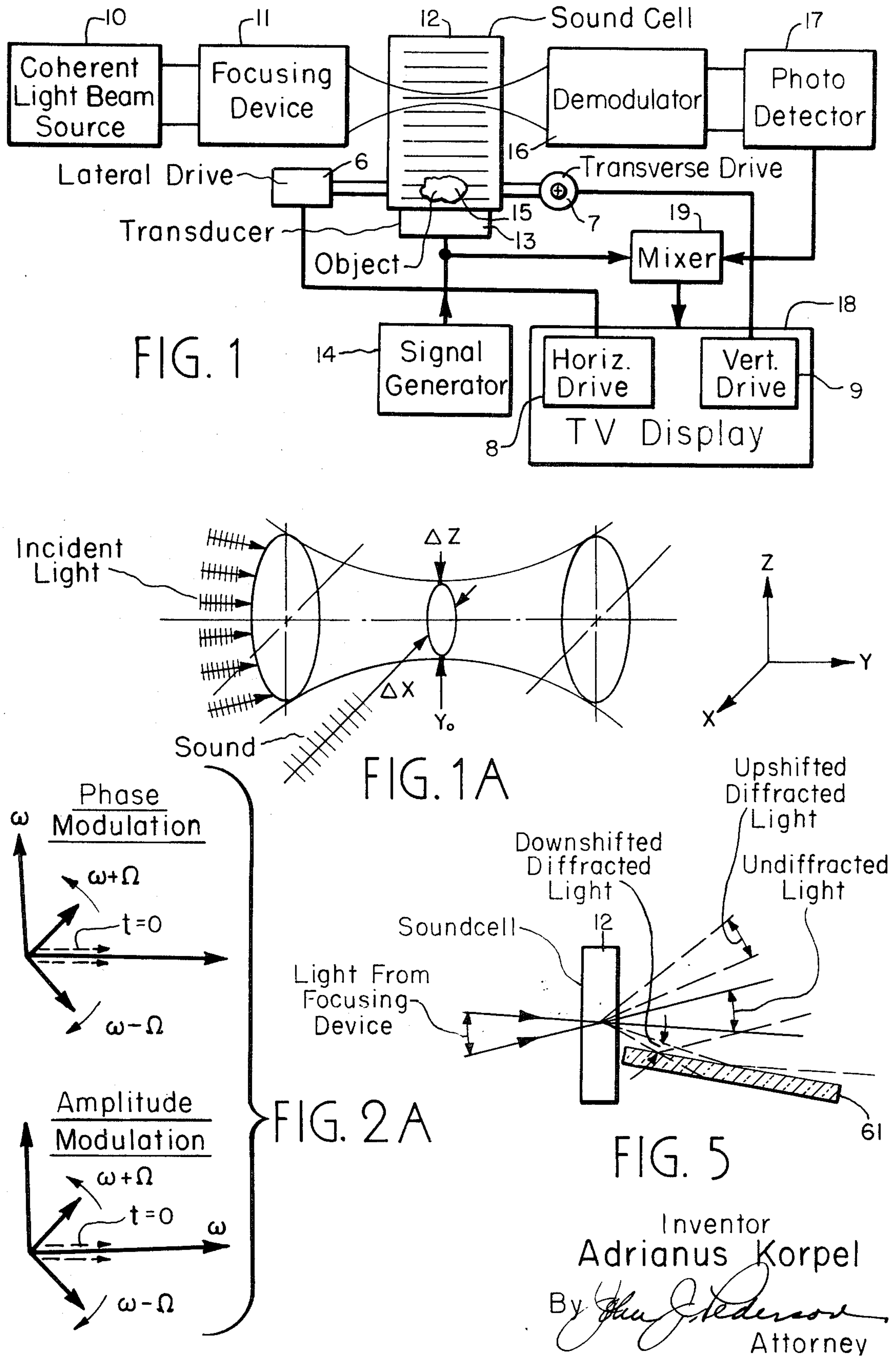
FIG. 1 illustrates schematically a complete system constructed in accordance with the invention for producing a holographic image of an object by optically sampling a sound field.
FIG. 1A is a schematic diagram of the focal region of the light beam within the sound cell of FIG. 1.
FIG. 2A is a diagram useful in explaining the action of the demodulator of FIG. 2.
FIG. 5 is a schematic detail of a system according to FIG. 1 modified for the case in which the light emergent from the sound cell is diffracted into spatially separate beams.

In FIG. 1 substantially monochromatic light is projected from a source 10, which may comprise a laser, to a focusing device 11, which projects the light in a converging beam into a light-sound interaction cell 12 positioned in the path of the converging beam. The focusing device 11 causes the converging beam to come to a diffraction limited focus within a small focal area in the sound cell and can be adjusted to move the focal spot anywhere within the sound cell 12. The sound cell contains an appropriate medium capable of supporting sound waves, such as water or castor oil, and sound waves are propagated in the sound cell nominally transversely to the light beam to set up a sound field therein by conventional electroacoustic transducer 13, in response to an electrical constant frequency signal from signal generator 14. Typically the sound cell also is provided with a receptacle to receive an object 15 for examination and through which the sound wave fronts are also propagated.

The light projected into the cell undergoes diffraction and refraction effects in a scattering interaction within the sound field and is thereby both spatially and temporarily modulated by this sound field. A demodulator device 16 is interposed in the path of the light emerging from sound cell 12. This device may be either a spatial filter, such as a suitably positioned knife edge, or a quarter waveplate-analyzer combination, when the light incident upon the sound cell is polarized, and an acoustic medium exhibiting dynamic birefringence is used. Such emergent light, comprising both scattered and nonscattered components, is thereby demodulated and allowed to pass to a photodetector 17 to produce an output signal for controlling a display device, such as television display 18.

In order for the display 18 to display an image of object 15, the focal interaction region is made to sample a cross section of the sound field point-by-point. This may be accomplished by mechanically moving the sound cell by means of lateral drive 6 and transverse drive 7 synchronized to move the cell simultaneously, thereby sampling a cross section of the sound field transverse to the direction of the sound propagation. Of course, other methods of sound field sampling with the focal region could be used as well, and other cross sections may be sampled in a similar manner, with adjustment in the vertical direction being also possible. Thus the photodetector produces an output signal representative of this sound field scan. Signals synchronized respectively with the lateral drive 6 and transverse drive 7 respectively are fed to horizontal drive 8 and vertical drive 9 of the television display 18 so that the amplitude information of output signal input to the display causes an image to be scanned in the conventional manner and in accordance with the sampling of the sound field. Since the rate of such a scan may be quite slow in comparison to the usual video scanning rates, an image storage tube may be employed to enhance the persistence of the image displayed.

Instead of a conventional television image, a hologram may be displayed upon the display 18 by utilizing the phase information of the output signal as well as the amplitude information. In this case a phase reference signal from signal generator 14 is obtained and heterodyned with the output signal from photodetector 17 in a mixer 19, as shown in FIG. 1, with the mixer output now controlling the display 18. A pattern will then be displayed upon the display 18 which if photographed yields an acoustic hologram of the object. A more detailed explanation of the formation of such a hologram using this system of signal generator 14, photodetector 17, mixer 19 and television display 18 can be found in "Rapid Sampling of Acoustic Hologram by Laser-Scanning Technique," A. Korpel and P. Desmares, Journal of the Acoustic Society of America, Vol. 45, No. 4, pp. 881–884, Apr. 1969.

To aid in explaining the operation of the light-sound interaction within sound cell 12, the schematic illustration of the focal interaction region of the sound cell set forth in FIG. 1A will be employed. The direction of sound propagation is $x$, the direction of light propagation is $y$, the width of the focal spot is $\Delta x$, and the height of the beam at the focal spot is $\Delta z$, which we will assume is much larger than $\Delta x$, but smaller than the resolution required in the $z$ direction in order to simplify to a two-dimensional calculation. In any case, if a line light source extending in the $z$ direction is used, which is usually the experimental light source, this will described the actual case exactly. Then with $\Delta x$ being small, the focused laser beam in conjunction with the use of the demodulator 16 essentially samples the sound field in the small cross section of the $yz$ plane, as will be shown more fully later.

The converging light beam traverses the sound cell so that the light beam axis $y$ is transverse to the nominal direction of propagation $x$ of the sound wave fronts. The sound field is perturbed by the object 15 within the sound cell and thereby acquires a spatial modulation. When first entering the sound cell from the focusing device 11, the width of the light beam in the direction of sound propagation $x$ is much larger than the wavelength of the sound. But within the focal region, the beam width $\Delta x$ becomes narrow compared to one-half of the sound wavelength; also, the length of the interaction region in the direction of the light propagation over which this condition obtains is small.

The spatial aspects of the total light-sound interaction in the cell are best explained by dividing the interaction into those interactions occurring within the focal interaction region, i.e., where the light beam width is of the same order down to narrower than half the sound wavelength and those occurring outside in the wide regions of the light beam, where the light beam is wider than half the sound wavelength. The temporal aspects of the interaction process are reflected by the fact that (for weak interaction) the scattered light consists of two components with frequencies $\omega+\Omega$ and $\omega-\Omega$ respectively, where $\omega$ is the light frequency and $\Omega$ the sound frequency.

The functioning of the photodetector, including the components alluded to above, may be described as the beating or superheterodyning of these two components with the unmodulated and nonscattered portion of the light so as to result in the generation by the photodetector 17 of two electrical beat signals, both at frequency $\Omega$. Unfortunately, however, the temporal modulation of the emerging light is essentially phase modulation. As a consequence, in the absence of a demodulator device, the two electrical signals referred to above are in opposite phase and would cancel each other out. The demodulator 16 is inserted in the emergent light to frustrate this cancellation so that at the photodetector 17 the impinging light exhibits amplitude rather than phase modulation over at least a part of its cross section, resulting in a useful output at the beat frequency $\Omega$.

In a typical demodulation device to be described below in greater detail, the focal interaction region of the incident light is imaged onto the photodetector by means of a system of lenses. As explained above, the scattered light in the image plane consists of two parts, the light scattered by the sound field within the narrow part of the light beam and the light scattered by the sound field within the wide part. The first part is imaged coincident with the image of the nonscattered part of the focal region; the second part forms diffraction images geometrically remote from this region. Then only the first part efficiently contributes to the heterodyning process and hence the generated electrical signal reflects the contributions of this part only; i.e., it is indicative of the sound field only in the narrow region of the light beam. It should be pointed out that the foregoing simple analysis for the case of the focal interaction region imaged upon the photodetector is correct only as long as the demodulator device inserted into the light path does not appreciably change the appearance of the total image in the image plane. In other cases, despite the breakdown of this analysis, it remains true that it is the light scattered from the focal interaction region which most efficiently contributes to the heterodyning process, and the output signal; moreover, the actual location of the photodetector is quite uncritical and need not be in the image plane. This is because a photodetector essentially measures the variations in instantaneous power flow and these do not usually change appreciably with distance along the path of the light.

Figure 2:
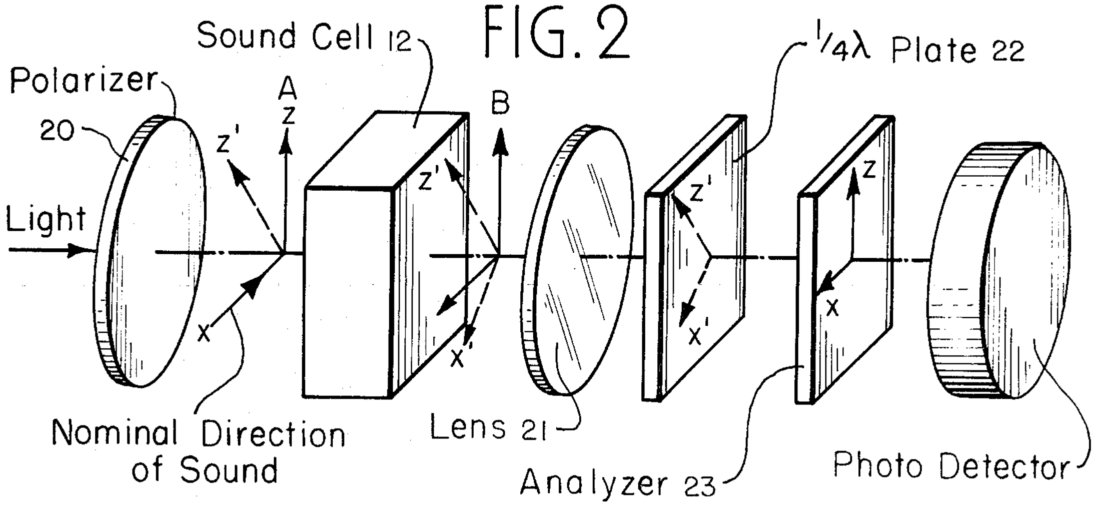
FIG. 2 is a schematic illustration of one type of demodulator useful in the system of FIG. 1.

A particular demodulation device as shown in FIG. 2 which does not affect the image uses a polarizer-quarter-waveplate-analyzer combination to convert phase modulation to amplitude modulation, which is readable by the photodetector 17. Such a demodulator is described in "Collinear Heterodyning in Optical Processors," H. R. Carleton, W. T. Maloney, G. Meltz, Proc. IEEE, Vol. 57, No. 5, May 1969.

The feasibility of this technique is easily appreciated if for the light traveling toward the photodetector we adopt for a moment the electrical analogy of a phase-modulated electrical signal having two sidebands in quadrature to the carrier, in accordance with the foregoing optically based development. Figure 2A gives an illustration in vector form for the phase-modulated situation. Then it is seen that to convert this to an amplitude modulation which can be seen by the photodetector, the sidebands must be delayed or advanced in phase by 90° with the carrier. This is also illustrated vectorially in FIG. 2.

The ability to readily accomplish such a conversion depends upon the presence in the scattered light of a component which is polarized orthogonally to the incident light. A number of solids and liquids exist, for example, castor oil and crown glass, which will cause such a condition for the scattered light, provided a polarization of the incident light exists at approximately 45° to the direction of propagation of the sound; accordingly, to make use of this method of demodulation, such an appropriate acoustic medium within the cell 12, as well as suitably polarized incident light, must be used.

FIG. 2 illustrates schematically the phase change demodulator as used with the system of FIG. 1 with its elements oriented along the $x$ axis in the direction of light travel. The light incident upon sound cell 12 is polarized at 45° to the $z$ axis in the $z'$ direction, as indicated at A, by polarizer 20. The light emergent from sound cell 12 includes a component of the scattered light polarized at 45° to the $x$ axis in the $x'$ direction, which is characterized at B. The lens 21 gathers the emergent light for projection to photodetector 17. The quarter-waveplate 22 receives the light directed to the photodetector and has its principal axes in the $x'$ and $z'$ directions, while the analyzer 23 is interposed between the photodetector 17 and the quarter-waveplate, with its principal axis oriented in the $x$ direction or in the $z$ direction, whichever is more convenient.

The original incident light traveling in the $y$ direction and polarized in the $z'$ direction at 45° to the direction of sound propagation by polarizer 20 acquires a scattered component polarized orthogonally to the incident light, in the $x'$ direction, upon passage through sound cell 12 equipped with an acoustic medium exhibiting dynamic birefringence upon application of a sound field, such as castor oil or crown glass. The quarter-waveplate 22 transmits light of both polarizations while introducing a 90° phase-shift between this incident and scattered light. The analyzer 23 then picks out the common in-phase component of the combined incident and scattered light, with mixing taking place at the surface of photodetector 17 so that the light emergent from the light-sound interaction is finally demodulated to result in an output signal from the photodetector 17 to the recording or display apparatus 18 of frequency Δ, which is the original sound propagation frequency, with amplitude and phase representative of that within the focal spot of the sound cell. Strictly speaking, the lens 21 is not necessary, as long as the other elements and the photodetector intercept all of the emergent light.

Figures 3, 4:
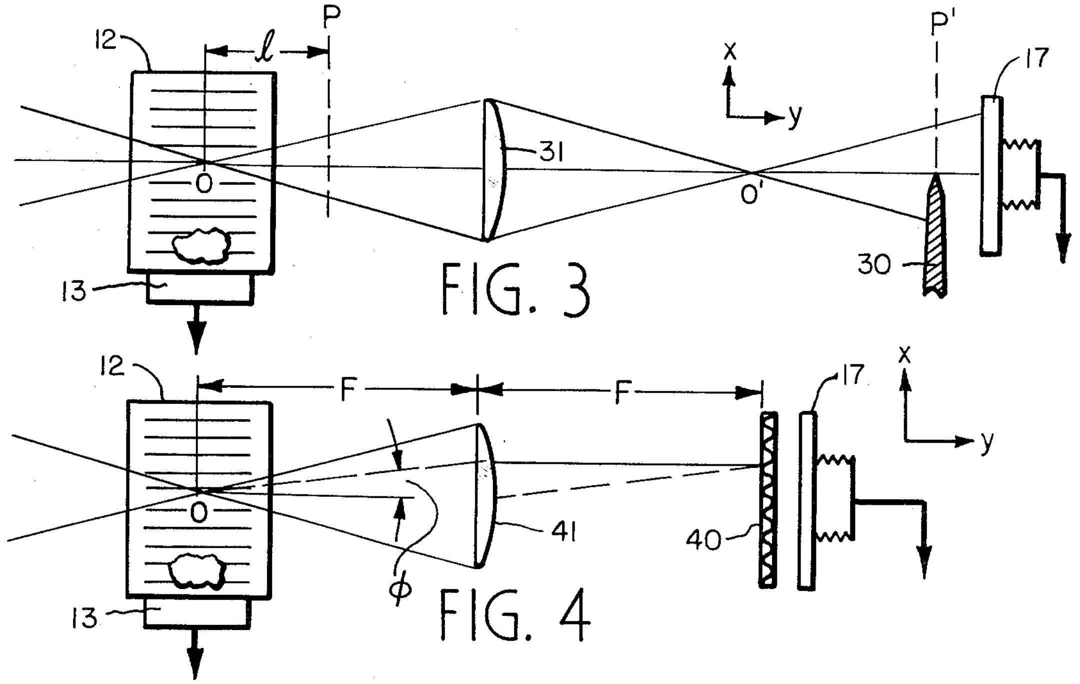
FIG. 3 is a detail of the system of FIG. 1 wherein a spatial filter is used as the demodulator.
FIG. 4 is a detail of the system of FIG. 1 wherein a variant arrangement of the spatial filter demodulator is used.

Another type of demodulator which may be employed at 16 in FIG. 1 is a spatial filter of appropriate form, examples of which are shown in FIGS. 3 and 4 and which will be described in detail. Whereas, in the first described demodulator, specific positions of the various elements is of no consequence, the position of a spatial filter is extremely important. This is so because a spatial filter in general rescatters both the unmodulated and modulated portions of the emerging light in such a way that the resultant phase relationships between the emerging plane-wave components depends on the position of the spatial filter. As a consequence the phase and amplitude distribution of the resulting image formed by a lens system of the focal interaction region in the sound field depend greatly on the relative position of the spatial filter with respect to the image plane. It is then no longer correct when using a spatial filter demodulator to infer that the wide portions of the light beam generate diffraction images which are geometrically remote from the image of the narrow focal region and hence make no net contribution to the output signal of photodetector 17. It is generally found that the resultant signal current consists of contributions of varying amplitude and phase contributed by portions of the sound field in the path of the central ray of light. Thus with reference to FIG. 1A, if the incident light is focused at position $Y=Y_o$ the resulting signal current may be written $$I(y_o)=C\int S(y-y_o)\,\mathcal{C}(y-y_o)\,dy \qquad (1)$$

where $C$ is a proportionality constant, $S(Y-Y_o)$ denotes the sound amplitude at the position $Y-Y_o$ and $\mathcal{C}(Y-Y_o)$ is a weighting function whose phase and amplitude represents the relative contribution of the sound field at $(Y-Y_o)$. The function $\mathcal{C}$ depends on the character of the spatial filter and its position relative to the image plane. Although in general the distribution $S(Y_o)$ can be derived completely from a knowledge of $I(Y_o)$ and $\mathcal{C}(Y-Y_o)$, it is in many cases convenient to have the function $\mathcal{C}$ exhibit a sharp narrow peak around $Y-Y_o=O$ so that $I(Y_o)$ itself closely resembles $S(Y_o)$. In fact, such a behavior is characteristic of the first-described demodulator of FIG. 2. It can be shown that in this special case $$\mathcal{C}(y-y_o)=\frac{\sin\,[\pi(y-y_o)/(\Lambda/\lambda)\,\Delta x]}{\pi(y-y_o)/(\Lambda/\lambda)\,\Delta x} \qquad (2)$$

where λ is the original light frequency and Λ is the sound wavelength. It can also be shown that resolution obtainable is $(\Lambda/\lambda)<\sim x$, with $\Delta x$, being the width of the focused spot of light, as was seen above in FIG. 1A. It will be seen that the function peaks near $Y-Y_o=0$.

From the previous description, it is evident that $\Delta x$ represents the "coarseness" with which the sound field is sampled and hence is a measure of the resolution obtained with the spatial filter demodulator. Thus if, for instance, the light beam is focused to a width of 10 wavelengths of light, i.e., $\Delta x=10\lambda$, then the resolution obtained equals $(\Lambda/\lambda)\Delta x=10\Lambda$; that is, 10 wavelengths of sound.

Of the many types of spatial filters which it is possible to use all will be characterized by having a transmissivity varying according to some function of the distance in the direction of sound propagation. Two which are of special importance are the knife edge and the neutral density wedge. Yet another spatial filter which may be applied in a similar manner and whose theory of operation is similar is an aperture extending transversely to the direction of light propagation and varying in the height of opening in the direction of sound propagation. A schematic diagram of a system according to FIG. 1 in which a spatial filter of the knife-edge type is used is shown in FIG. 3. All elements are the same as in FIG. 1, except that the details of the spatial filter version of demodulator 16 are shown. They include the knife edge 30 and the lens 31 which images the focal region at O′. The knife edge 30 in this case is located in plane P′ beyond O′. The plane P′ itself contains the image of the emerging light cross section at P, a distance $l$ from the focus at O. The photodetector 17 collects the light passed by by the spatial filter, as before. It may be shown that, if the top part of the knife edge just touches the optic axis of the system, the function $\mathcal{C}$ is given by:

$$\mathcal{C}=\frac{\sin\left[\pi\frac{y-y_o}{\Lambda^2/\lambda}\left(1-\frac{y-y_o}{l}\right)\right]}{\pi\frac{y-y_o}{\Lambda^2/\lambda}} \qquad (3)$$

for positions $l$ of the knife edge such that $l>(\Delta x)^2 1\lambda$.

For a general value of $l$ this is a rather complicated function. Two cases are however of particular interest.

a. When the centered knife edge 30 is positioned at a distance from O′ such that $l>>\Lambda^2/\lambda$, the function $\mathcal{C}$ may be approximated by:

$$\mathcal{C}=\sin\frac{[\pi(y-y_o)/(\Lambda^2/\lambda)]}{\pi(y-y_o)/(\Lambda^2/\lambda)} \qquad (4)$$

As seen from a comparison with equation (2), the behavior of $\mathcal{C}$ is similar to that for the waveplate-analyzer demodulator, except that the obtainable resolution is given by $\Lambda^2 1\lambda$ rather than by $\Delta x(\Lambda/\lambda)$.

b. When the centered knife edge 30 is positioned at a distance from O′ such that $l<<\Lambda^2/\lambda$, the function $\mathcal{C}$ may be approximated nearly everywhere by:

$$\mathcal{C}=\sin\frac{[\pi(y-y_o)^2/(l\Lambda^2/\lambda)]}{\pi(y-y_o)/(\Lambda^2/\lambda)} \qquad (5)$$

This function behaves asymmetrically about $Y-Y_o$, and accordingly it is found that the contributions of the sound field at opposite sides of the point $Y-Y_o$ will be in opposite phase. As a result the output signal will now be representative of the derivative $ds/dy$ of the sound field at $Y_o$, rather than the amplitude of the sound field itself. For certain applications this is very useful, as it tends to make clearly visible sharp discontinuities, such as edges on object 15, in the sound field. It is also seen from equation (5) that the "coarseness" of resolution of the sampling is of the order of $\sqrt{l\Lambda^2/\lambda}$. The smallest resolution, corresponding to the limit of applicability of equation (3), is reached when $l=(\Delta x)^2/\lambda$ and equals $(\Lambda/\lambda)\Delta x$, the same resolution as achieved with the first-discussed waveplate-analyzer demodulator of FIG. 2. Moreover, it may be shown that if $l$ is made even smaller, the form of the $\mathcal{C}$ function remains essentially the same as for the case where $l=(\Delta x)^2/\lambda$, resulting in the same resolution. Hence to achieve this resolution, the knife edge 30 must be placed such that $l<(\Delta x)^2/\lambda$ or, which is the same, the plane P must be within the depth of focus $(\Delta x)^2/\lambda$ of the incident light.

In a similar way the behavior of other types of spatial filters may be illustrated, with the $\mathcal{C}$ function notation as a convenient basis for comparison of behavior. The neutral density filter is found to be a convenient alternative demodulator; it can be shown that a spatial filter, such as a neutral density filter, having a transmission coefficient varying linearly in the direction of sound propagation, exhibits a $\mathcal{C}$ function similar to that of the waveplate-analyzer demodulator when placed far away from O′ and similar to that of the centered knife edge in case (*b*) when placed similarly within the depth of focus of the image at O′. Its other characteristics connected with the function are found to be comparable in a like manner.

A spatial filter demodulator may also be used which includes a lens positioned such that the image O′ of O lies at infinity, or, as is illustrated in FIG. 4, with the point O lying in the front focal plane of the lens 41. FIG. 4 illustrates schematically the relationship and elements of a system according to that of FIG. 1 employing such an arrangement. The elements are the same as in FIG. 1, except that the details of a spatial-filter demodulator are shown. They include the neutral density filter 40 and the lens 41 having a focal length F. The spatial filter is positioned in the back focal plane of this lens. The back focal plane has the property that a plane wave of light incident at a small angle $\phi$ onto the lens will be focused to a diffraction limited spot at a distance $$x=F\phi \qquad (6)$$

from the optical axis of the system. Accordingly it is now more convenient to describe the behavior of the system in terms of the individual plane wave components of the scattered and nonscattered light. For this purpose we refer to the physical model of Bragg diffraction.

Figure 4A:
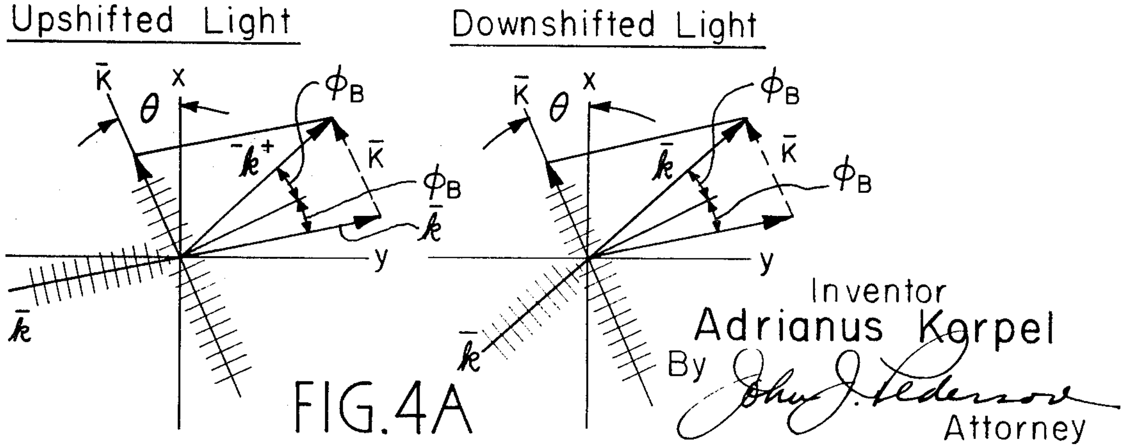
FIG. 4A is a diagram useful in explaining the light-sound interaction within the sound cell.

According to this model, a specific plane wave of sound denoted by propagation vector $\overline{K}$ in FIG. 4A, can diffract light in only two ways or directions as shown in the Figure. Since the incident light beam is convergent, the beam's plane wave spectrum will contain plane light wave fronts oriented to yield both upshifted and a downshifted diffraction components at frequencies $\omega+\Omega$ and $\omega-\Omega$ respectively and with wavevectors $\bar{k}+$ and $\bar{k}-$, the former having a vector orientation at angles $\theta+\phi_B$, and the latter having a vector orientation $\theta-\phi_B$ with respect to the $Y$ axis. The angle $\phi_B$ is called the Bragg angle and is given by $\sin\phi_B=\lambda/\Lambda$. The plane wave spectrum of the scattered light which is upshifted, now denoted as $\mathcal{C}_1+$, that of the downshifted light, denoted at $\mathcal{C}_1-$, as well as the phase quadrature discussed above, is given by:

$$\mathcal{C}_1^+(\theta+\phi_B)=jA\,\mathcal{C}_1(\theta-\phi_B)\,\mathcal{C}_S(\theta) \qquad (7)$$

$$\mathcal{C}_1^-(\theta-\phi_B)=jA\,\mathcal{C}_1(\theta+\phi_B)\,\mathcal{C}_S^*(\theta) \qquad (8)$$

Now since the upshifted light plane wave front caused by the sound wave front at angle $\theta$ will have an orientation $\phi=\theta+\phi_B$, it can be said by virtue of equation (3) that this is representative of the focal position of such a plane wave, and similarly for the downshifted light, which will focus at position $\phi=\theta-\phi_B$.

If a photodetector were placed at the focal plane of lens 41, mixing would occur at each such focal position between the light from the scattered plane waves having the proper angular orientation $\phi$ to be focused at such a position, and light from the incident plane wave of the same orientation. The photodetector 17 would be expected to yield a signal current $I_\Omega$ at the sound frequency $\Omega$ for each upshifted and downshifted component. To more clearly follow the various components of light in their interactions after leaving the sound cell, with the objective of analytically deriving the form and position of the filter needed, we again utilize the Bragg diffraction model to represent this photodetector current $I$ . Its components due to the upshifted light as well as downshifted component caused by $\mathcal{C}_S(\theta)$ are then as follows:

$$I_\Omega^+=c\,\mathcal{C}_1^+(\theta+\phi_B)\,\mathcal{C}_1^*(\theta+\phi_B) \qquad (9)$$

$$I_\Omega^-=c\,\mathcal{C}_1(\theta-\phi_B)\,\mathcal{C}_1^{-*}(\theta-\phi_B) \qquad (10)$$

where the asterisk denotes the complex conjugate quantity or, using equations (7) and (8):

$$I_\Omega^+=jcA\,\mathcal{C}_1(\theta-\phi_B)\,\mathcal{C}_1^*(\theta+\phi_B)\,\mathcal{C}_S(\theta) \qquad (11)$$

$$I_\Omega^-=-jcA\,\mathcal{C}_1(\theta-\phi_B)\,\mathcal{C}^*(\theta+\phi_B)\,\mathcal{C}_S(\theta) \qquad (12)$$

If we add these to find the total $I_\Omega$ we find the output to be 0, consistent with our previous conclusions for the output to be expected from a nondemodulated beam impinging at the photodetector 17.

But it is found that the insertion at the focal plane of lens 41 of a spatial filter whose amplitude transmissivity is some function of $\phi$, or $x$, since $x$ is directly proportional to $\phi$, which we shall call $\Gamma(\phi)$, will mitigate cancellation effects and cause a net output signal from the photodetector. Analytically this can be shown by multiplying both diffracted and undiffracted light incident at each angular orientation $\theta+\phi_B$ by the transmissivity for that orientation $\Gamma(\theta+\phi_B)$. Similarly the light at orientation $\theta-\phi_B$ is multiplied by $\Gamma(\theta-\phi_B)$ to obtain the net light available for mixing. Then the expression for the total signal current $I_\Omega$ becomes:

$$I_\Omega=I_\Omega^++I_\Omega^-=jcA\int\mathcal{C}(\theta-\phi_B)\,\mathcal{C}_1^*(\theta+\phi_B)\times[|\Gamma(\theta+\phi_B)|^2-|\Gamma(\theta-\phi_B)|^2]\,\mathcal{C}_S(\theta)\,d\theta \qquad (13)$$

It is obvious that some output will result, in contrast to the no-filter case, as long as $$|\Gamma|^2-|\Gamma|^2\neq 0.$$

A simpler approximation of the signal current is possible if the following substitutions are made, which are good first approximations for a small Bragg angle:

$$\mathcal{C}_1(\theta-\phi_B)\approx\mathcal{C}_1(\theta) \qquad (14)$$

$$\mathcal{C}_1(\theta+\phi_B)\approx\mathcal{C}_1^*(\theta) \qquad (15)$$

$$|\Gamma(\theta+\phi_B)|^2=|\Gamma^2|'(\theta)\phi_B+|\Gamma|^2(\theta), \qquad (16)$$

where $$|\Gamma|^{2\prime}=\frac{\alpha|\Gamma|^2}{\alpha\phi} \qquad (17)$$

$$|\Gamma(\theta-\phi_B)|^2\approx-|\Gamma^{2\prime}|(\theta)\phi_B+|\Gamma|^2(\theta) \qquad (18)$$

Then the current signal can be expressed as:

$$I_\Omega = 2jcA\phi_B \int |\mathcal{C}_1(\theta)|^2 |\Gamma|^{2'}(\theta) \cdot \mathcal{C}_s(\theta) d\theta \quad (19)$$

It is also found that the use of such spatial filters with transmissivity a function of $\phi$ as the demodulator 16 in FIG. 1 will not only cause an output current from photodetector 17, but will also cause this signal to have a phase and amplitude modulation which may be fairly representative of the phase and amplitude at the focal interaction region within the sound cell 12 in much the same way as was expressed by the $\mathcal{C}$ function used with FIG. 3.

However, in the present case it is more convenient to describe the magnitude of the output current as being proportional to the amplitude of a fictitious sound field which we will call $S'(x,y)$, at the focal interaction region, this fictitious sound field being related to the real sound field $S(x,y)$. We find that the current $I_\Omega$ can be stated as:

$$I_\Omega = 2jcA\phi_B S'(o,o) \quad (20)$$

with $S'(o,o)$ being the amplitude of the fictitious sound field at the focal region, and where the plane wave spectrum $\mathcal{C}_{s'(\theta)}$ of the fictitious sound field is related to the spectrum $\mathcal{C}_{s(\theta)}$ of the real sound field as follows:

$$\mathcal{C}_{s'}(\theta) = [|\mathcal{C}_1(\theta)|^2 |\Gamma|^{2'}(\theta)]\, \mathcal{C}_s(\theta) \quad (21)$$

Then by definition, $$S'(x, y) = \int \mathcal{C}_{s'(\theta)} e^{-jKx\cos\theta - jKy\sin\theta} d\theta \quad (22)$$

and the relationship between $I_\Omega$ and $S'(o,o)$ follows directly, from the first approximation expression (equation 19) for $I_\Omega$.

From the equation 21 for $\mathcal{C}_s$, it can be seen that the factor which relates the fictitious to the real sound field is:

$$[|\mathcal{C}_1(\theta)|^2 |\Gamma|^{2'}(\theta)] \quad (23)$$

which we will call the aperture function. Thus the resolution of the device, or the extent to which the output current is representative of the amplitude of the real sound field at the focal interaction region within the cell, is dependent on the aperture function, or more basically, the amplitude transmissivity function $|\Gamma(\phi)|$ and the plane wave spectrum function of the real sound field $\mathcal{C}_s$.

These principles have been applied to a number of spatial filter possibilities of various construction to achieve transmissivities varying as a function of $\phi$, with results bearing out the theoretical calculations of an output related to the focal region sound-field modulation. Then among the possible constructions which may be used as the spatial filter 40 are knife-edges, and preferably, transparencies whose neutral density in the $x$ direction varies according to $|\Gamma(\phi)|^2$. Variable height apertures whose height in the $z$ direction varies with the distance $x$ according to $|\Gamma(\phi)|^2$ may also be used. The photodetector itself, especially if a planar diode, may be part of the spatial filter by being segmented into a number of independent output sites and various output sites given different phase shifts.

Such a segmented photodetector provides a spatial filter phase factor which is approximately $\exp(jf(\theta))$. This offers at least one advantage in the processing of the received signal; an electronic focusing effect can be had if, for example, $f(\theta) = -a\theta^2$; then the effect would be to sample a point in the sound field in a different position on the $x$ axis. Similarly a term $f(\theta) = -b\theta$ would focus on a different point on the $y$ axis, to a first paraxial approximation. Also, the use of the lens 41 is not absolutely necessary. It is sufficient that the spatial filter be located in the far field of the incident and diffracted light.

The foregoing analyses of mixing and demodulation in the invention have assumed small Bragg angles, more specifically, that the total spread of angles found in the spectrum of plane wave components of the incoming light is far greater than twice the Bragg angle. If this is no longer true, it is found that the diffracted light becomes spatially separated from the undiffracted light as shown in FIG. 5, and in the focal plane of a lens such as 41 in FIG. 4, each type of light would be focused in different regions of the plane. Mixing as has been assumed heretofore could not then occur.

However, it is not necessary to accept such a limitation on angular spread of the incident beam. FIG. 5 illustrates a system according to FIG. 1 having a light beam incident upon sound cell 12 of the type discussed above, giving rise to spatially separated diffracted light. In such a case an inclined reflective surface 61 can be added in the path of one of the emergent spatially separated diffracted beams which will serve to redirect the beam in a direction along the path of the undiffracted light beam, or vice versa. Again the beams would be caused to mix at the surface of a photodetector as in FIGS. 1, 2, 3 and 4 to obtain a beat signal and use similar demodulators, if necessary.

In the operation of systems exemplified by FIG. 1 together with the various demodulators shown in other figures, small objects such as wires placed inside the sound cell in the path of the sound waves have been reproduced both as conventional images upon a television screen, and as an acoustic hologram. Thus the system is useful as an acoustic microscope capable of both conventional and holographic display. The techniques are particularly valuable at the higher sound frequencies and are not confined to the imaging of any particular cross section of the sound field, since the sampling is on a point-by-point basis.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A system for producing a signal varying in accordance with the acoustic amplitude and phase exhibited in a small localized region about any chosen point within a sound field of waves propagated at a constant acoustic frequency, comprising:

a light sound interaction cell which includes a sound-conducting medium and which operates at a constant acoustic frequency to propagate sound waves throughout said medium establishing said sound field;

means for projecting into said sound field a coherent monochromatic light beam incident in a direction generally transverse to that of the sound propagation;

means for focusing said incident light beam into a small localized region about any desired point within said sound field, said focal region having a width in the direction of sound propagation at said point which is narrower than half the wavelength of the sound waves, said sound waves imparting temporal and spatial modulation in a scattering interaction in accordance with the phase and amplitude of said sound at said focal region to the light emerging from the sound field; and means including a photodetector receiving said emergent light for detecting the beat frequency between the scattered and nonscattered emergent light and for producing a signal in accordance with said beat frequency, said signal being simply related to said acoustic frequency and being modulated in accordance with the amplitude and phase in said small focal region.

2. A system for the display of image information borne by an acoustic field, comprising:

a light-sound interaction cell which includes a sound-conducting medium, and which operates at a constant acoustic frequency to propagate sound waves throughout said medium, establishing a sound field;

means for spatially modulating said sound field with image information;

means for projecting into said sound field a coherent monochromatic light beam incident in a direction generally transverse to that of the sound propagation;

means for focusing said incident light beam into a small localized region about any desired point within said sound field, said focal region having a width in the direction of sound propagation at said point which is narrower than half the wavelength of the sound waves, said sound waves imparting temporal and spatial modulation in a scattering interaction in accordance with the phase and amplitude of said sound at said focal region to the light emerging from the sound field;

means including a photodetector receiving said emergent light for detecting the beat frequency between the scattered and nonscattered emergent light and for producing a signal in accordance with said beat frequency, said signal being simply related to said acoustic frequency and being modulated in accordance with the amplitude and phase in said small focal region;

means for scanning an arbitrary cross section of said sound field with said focused region in a definite pattern and rate;

and television display means for displaying said modulated signal and having a video scan synchronized in accordance with said means for scanning the sound field, said signal modulating said video scan to produce an image of said cross section.

3. A system as in claim 2 wherein said system further includes:

a source of said constant acoustic frequency signal supplying said operating acoustic frequency to said sound cell;

means for mixing a part of said acoustic frequency signal with said modulated photodetector signal; and wherein said video scan of said television means is modulated with said mixed signal to produce a holographic image of said sound field cross section.

4. A system as in claim 3 wherein said sound cell further includes a receptacle for receiving an object within said sound field for examination, and wherein said means for spatially modulating said sound field comprises said object.

5. A system as in claim 1 which further includes means interposed in the path of said incident light beam for polarizing the light of said beam in a direction generally 45° to that of the propagation of the sound, and in which said sound-conducting medium is one which exhibits dynamic birefringence under the influence of said sound field to impart a further polarization to said emergent light such that at least part of said scattered component is rendered orthogonally polarized to the nonscattered incident-light component, and which further includes a quarter-waveplate disposed in the path of said emergent light having two principal axes of transmission, one of which is aligned in the direction of polarization of the nonscattered component and the other of which is aligned in the direction of polarization of the scattered component to transmit both components while introducing a 90° phase shift between said components, and an analyzer with its axis of transmission positioned in a direction generally 45° to that of each of said components to transmit their common component to said photodetector to detect said beat frequency and produce said signal.

6. A system as in claim 1 in which said means for detecting the beat frequency comprises:

a spatial filter placed between said photodetector and said sound cell and extending in the direction of sound propagation transversely to the direction of light propagation, whose transmissivity varies with the position in the direction of the sound propagation.

7. A system as in claim 6 wherein said spatial filter comprises a neutral density filter.

8. A system as in claim 6 wherein said spatial filter comprises a variable height aperture, whose height varies in the direction of sound propagation.

9. A system as in claim 6 wherein said spatial filter comprises a knife edge in the path of said emergent light partially obstructing said light.

10. A system as in claim 6 wherein said means for detecting the beat frequency further includes a lens system placed between said sound cell and said spatial filter.

11. A system as in claim 10 wherein said lens system images said focal region approximately upon said spatial filter, such that said spatial filter lies within the depth of focus of said lens system.

12. A system as in claim 10 wherein said lens system images said focal spot at infinity, and said spatial filter is placed in the back focal plane of said lens system.

* * * * *